United States Patent
Yang et al.

(10) Patent No.: US 10,158,245 B2
(45) Date of Patent: Dec. 18, 2018

(54) METHOD AND APPARATUS FOR CONTROLLING ON-BOARD CHARGER

(71) Applicant: Hyundai Motor Company, Seoul (KR)

(72) Inventors: Si Hun Yang, Gyeonggi-do (KR); Woo Young Lee, Gyeonggi-do (KR); Jun Ho Kim, Gyeonggi-do (KR); Young Ho Kim, Incheon (KR); Jin Myeong Yang, Busan (KR); Jin Young Yang, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 15/362,100

(22) Filed: Nov. 28, 2016

(65) Prior Publication Data

US 2018/0069424 A1  Mar. 8, 2018

(30) Foreign Application Priority Data

Sep. 7, 2016   (KR) .......................... 10-2016-0114887

(51) Int. Cl.
*H02J 7/04*   (2006.01)
*H02J 7/00*   (2006.01)
(Continued)

(52) U.S. Cl.
CPC ............ *H02J 7/045* (2013.01); *H02J 7/0052* (2013.01); *H02J 7/022* (2013.01); *H02M 1/42* (2013.01);
(Continued)

(58) Field of Classification Search
CPC .. H02J 7/045; H02J 7/0052; H02J 2007/0059; H02M 1/44; H02M 1/42
(Continued)

(56) References Cited

U.S. PATENT DOCUMENTS 6,949,915 B2 *  9/2005  Stanley ............... H02M 1/4208
                                             323/207
7,012,413 B1 *  3/2006  Ye .......................... H02M 1/42
                                             323/222
(Continued)

FOREIGN PATENT DOCUMENTS

KR    2013-0057639 A    6/2013
KR    10-1558770 B1    10/2015
WO    1995022194 A1    8/1995

OTHER PUBLICATIONS

Singh et al.,"Voltage Controlled PFC Forward Converter Fed PMBLDCM Driver for Air-Conditioner", Dec. 2010, Osmania University, India, 16th National Power Systems Conference, Technical Report, pp. 417-422.*

(Continued)

*Primary Examiner* — Sun Lin
(74) *Attorney, Agent, or Firm* — Mintz Levin Cohn Ferris Glovsky and Popeo, P.C.; Peter F. Corless

(57) ABSTRACT

A method and apparatus for controlling an on-board charger (OBC) are provided. The method includes monitoring a voltage of an input power source, increasing or decreasing the voltage of the input power source to a preset output voltage of a power factor corrector (PFC), and operating a converter receiving the preset output voltage to adjust a switching frequency of the converter based on a ripple current of an output terminal of the converter. Additionally, the converter includes a first switch configured to receive a first voltage of a first capacitor mounted within the PFC and a second switch configured to receive a second voltage of a second capacitor mounted within the PFC.

20 Claims, 4 Drawing Sheets

(51) Int. Cl.
  *H02M 1/42*  (2007.01)
  *H02M 1/44*  (2007.01)
  *H02J 7/02*  (2016.01)
  *H02M 1/00*  (2006.01)
(52) U.S. Cl.
  CPC ........... *H02M 1/4225* (2013.01); *H02M 1/44* (2013.01); *H02J 2007/0059* (2013.01); *H02M 2001/007* (2013.01); *H05K 999/99* (2013.01)
(58) Field of Classification Search
  USPC ........................................................ 320/162
  See application file for complete search history.

(56) References Cited

U.S. PATENT DOCUMENTS

| | | | | |
|---|---|---|---|---|
| 7,403,400 B2* | 7/2008 | Stanley | ................ | G05F 1/70 323/225 |
| 8,829,722 B2* | 9/2014 | Kusch et al. | ......... | H02J 7/1423 307/10.4 |
| 8,981,727 B2* | 3/2015 | Kusch et al. | ....... | B60L 11/1868 320/134 |

OTHER PUBLICATIONS

Korean Office Action cited in corresponding Application No. 10-2016-0114887, filed Aug. 28, 2018.

\* cited by examiner

METHOD AND APPARATUS FOR CONTROLLING ON-BOARD CHARGER

CROSS REFERENCE TO RELATED APPLICATION(S)

This application claims the benefit of Korean Patent Application No. 10-2016-0114887, filed on Sep. 7, 2016, which is hereby incorporated by reference as if fully set forth herein.

BACKGROUND

Field of the Invention

The present invention relates to an on-board charger (OBC) and, more particularly, to a method and apparatus for controlling charging of an OBC.

Discussion of the Related Art

Recently, demand for eco-friendly vehicles has remarkably increased. An electric vehicle (EV) and a plug-in hybrid electric vehicle (PHEV) as eco-friendly vehicles require a charging device to charge a high-voltage battery mounted therein. The charging device is categorized into an on-board charger (OBC) and a quick charger. The OBC, which is compatible regardless of vehicle type as a standardized charger, performs charging by supplying a commercial alternating current (AC) power source (e.g., 220V) to a vehicle. The OBC receives electric energy (AC power source) from electric vehicle supply equipment (EVSE) and charges a high-voltage battery through an in-cable control box (ICCB). Charging may consume 4 to 6 hours according to battery capacity. A quick charger which performs charging using an external power supply charges the battery by variably supplying a direct current (DC) voltage of 100 to 400V to an electric vehicle and consumes less charging time (e.g., 30 to 40 minutes) through charging at a high voltage and high capacity.

Meanwhile, the PHEV using an engine in addition to a motor as a power source includes power source devices mounted therein, such as an engine, a motor, and a power converter, more than those in an EV or in an internal combustion engine vehicle. Therefore, utilization of an internal space of the vehicle is reduced in the PHEV. In addition, since the number of devices mounted in the PHEV increases, the price of the vehicle becomes high relative to other general vehicles. Accordingly, there is a growing need to reduce material costs of a charging device together with reducing the size of the charging device.

SUMMARY

Accordingly, the present invention is directed to an OBC control method and apparatus that substantially obviate one or more problems due to limitations and disadvantages of the related art.

An object of the present invention is to provide a method and apparatus for controlling an OBC using a converter capable of achieving overall downsizing and reducing material costs by reducing the number of components and simplifying configuration relative to a general converter used in a charging device. Another object of the present invention is to provide a method and apparatus for controlling a compact OBC through a new circuit structure by reducing the number of components which perform voltage control of a power factor corrector of an OBC and frequency control of a converter of the OBC.

The objects that can be achieved through the present invention are not limited to what has been particularly described hereinabove and other technical objects not described herein will be more clearly understood by persons skilled in the art from the following detailed description.

To achieve these objects and other advantages and in accordance with the purpose of the invention, as embodied and broadly described herein, a method of controlling an on-board charger (OBC) may include monitoring a voltage of an input power source, increasing or decreasing the voltage of the input power source to a preset output voltage of a power factor corrector (PFC), and causing a converter configured to receive the output voltage to adjust a switching frequency of the converter based on ripple current of an output terminal, wherein the converter may include a first switch configured to receive a first voltage of a first capacitor mounted within the PFC and a second switch configured to receive a second capacitor mounted within the PFC.

The converter may have voltage gain of a fixed value and the voltage gain may be a ratio of an output voltage to an input voltage of the converter. The increasing or decreasing may include adjusting a duty ratio of a switching module of the PFC. The PFC may include a charging module in which energy transmitted through duty ratio control of the switching module may be stored.

The first capacitor and the second capacitor mounted within the charging module may be connected in parallel. The method may further include adjusting the switching frequency by alternating switching operations of the first switch and the second switch. The switching frequency may also be adjusted according to the ripple current based on a fixed frequency within a threshold range. The first switch and the second switch may be connected in series. The adjustment the duty ratio may include performing control through a field effect transistor (FET) and a diode.

The present invention also provides a computer-readable recording medium in which a program for performed the above-described method is recorded. In another aspect of the present invention, an on-board charger (OBC) may include a monitoring unit configured to monitor a voltage of an input power source and ripple current of an output terminal, a power factor corrector (PFC) configured to increase or decrease the voltage of the input power source to a preset output voltage, a converter including a first switch configured to receive a first voltage of a first capacitor mounted within the PFC and a second switch configured to receive a second voltage of a second capacitor mounted within the PFC, and a controller configured to operate the PFC and adjust switching operations of the first switch and the second switch of the converter.

The converter may be configured to receive the output voltage of the PFC and vary switching frequencies of the first switch and the second switch based on ripple current of the output terminal. The converter may have voltage gain of a fixed value and the voltage gain may be a ratio of an output voltage to an input voltage of the converter. The controller may be configured to adjust duty ratio of a switching module mounted within the PFC. The PFC may include a charging module in which energy transmitted through duty ratio control of the switching module may be stored.

The first capacitor and the second capacitor mounted within the charging module may be connected in parallel. The controller may be configured to adjust a switching frequency by alternating switching operations of the first switch and the second switch. The controller may additionally be configured to adjust the switching frequency based on the ripple current based on a fixed frequency within a threshold range. The first switch and the second switch may be connected in series. The controller may be configured to adjust the duty ratio using a field effect transistor (FET) and a diode.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate exemplary embodiment(s) of the invention and together with the description serve to explain the principle of the invention. In the drawings.

DETAILED DESCRIPTION

Figure 1:
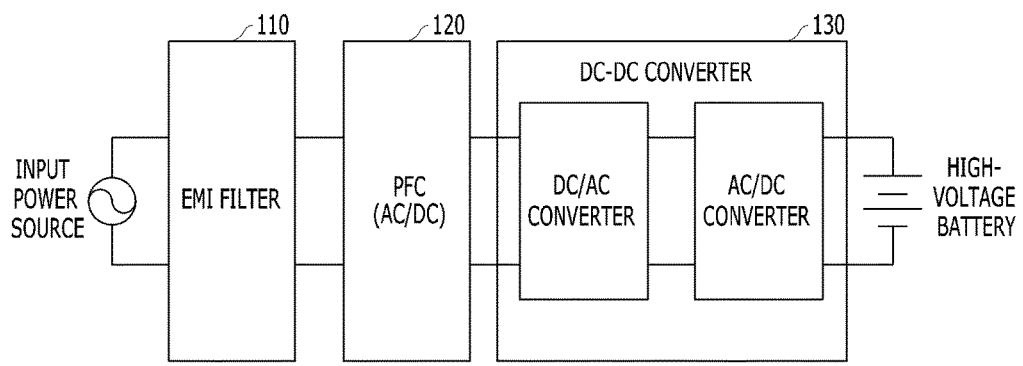
FIG. 1 is a diagram illustrating a charging control system of an OBC according to an exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Reference will now be made in detail to the exemplary embodiments of the present invention, examples of which are illustrated in the accompanying drawings. The suffixes "module" and "unit" used in the description below are given or used together only in consideration of ease in preparation of the specification and do not have distinctive meanings or functions.

Although all elements constituting the embodiments of the present invention are described as being integrated into a single one or operated as a single one, the present invention is not necessarily limited to such exemplary embodiments. According to exemplary embodiments, all of the elements may be selectively integrated into one or more and be operated as one or more within the object and scope of the present invention. Each of the elements may be implemented as independent hardware. Alternatively, some or all of the elements may be selectively combined into a computer program having a program module performing some or all functions combined in one or more pieces of hardware.

In describing embodiments, when an element is referred to as being "on (over)" or "under (below)", "before (in front of)", or "after (behind)", this includes the meaning that two elements directly contact each other or one or more other elements are disposed between two elements. All terms including technical or scientific terms have the same meanings as generally understood by a person having ordinary skill in the art to which the present invention pertains unless mentioned otherwise. Generally used terms, such as terms defined in a dictionary, should be interpreted to coincide with meanings in the related art from the context. Unless obviously defined in the present invention, such terms are not interpreted as having ideal or excessively formal meanings.

Additionally, in describing the components of the present disclosure, terms like first, second, A, B, (a), and (b) are used. These are solely for the purpose of differentiating one component from another, and one of ordinary skill would understand that the terms do not imply or suggest the substances, order or sequence of the components. If a component is described as "connected", "coupled", or "linked" to another component, one of ordinary skill in the art would understand that the components are not necessarily directly "connected", "coupled", or "linked" but also are indirectly "connected", "coupled", or "linked" via a third component.

In addition, in the following description of the exemplary embodiments disclosed herein, a detailed description of related known technologies will be omitted when it may make the subject matter of the exemplary embodiments disclosed herein rather unclear.

Hereinafter, an overall structure of a charging control system of an OBC according to an exemplary embodiment of the present invention will be described with reference to FIGS. 1 and 2 and problems generated in a general system will be discussed based on description of FIGS. 1 and 2.

In addition, a charging control method and structure in a power factor corrector (PFC) and a DC/DC converter of the charging control system of the OBC will be described with reference to FIG. 3. Additionally, configuration of the OBC for voltage control of a switching module of a power factor corrector (PFC) and frequency control of a converter and a control method therefor will be described with reference to FIGS. 4, 5, and 6.

FIG. 1 is a diagram illustrating a charging control system of an OBC according to an exemplary embodiment of the present invention. Referring to FIG. 1, the charging control system of the OBC of a vehicle has a structure in which an alternating current (AC) power source may be supplied as an input power source and may be stored in a high-voltage battery as energy through an electromagnetic interference (EMI) filter 110, a PFC 120, and a DC-DC converter 130. Constituent elements illustrated in FIG. 1 are not always necessary and the charging control system may be implemented with more elements or fewer elements.

Charging of an eco-friendly vehicle may be categorized into fast charging and slow charging. During slow charging, an OBC may be configured to rectify and boost an input power source (e.g., an external AC power source) and convert the AC power source into a DC power source to charge a battery of the eco-friendly vehicle with the DC power source. The OBC may include the DC-DC converter 130 (power converter) configured to perform a high-frequency switching on/off operation. The DC/DC converter 130 may be configured to generate an EMI problem due to the high-frequency switching on/off operation.

In particular, EMI refers to electromagnetic interference or propagation disturbance in which radiated or conducted electromagnetic waves affect an electronic device. Since the OBC is directly connected to an input power source (system power source) which is a power source of the charging control system, the EMI filter 110 capable of minimizing inflow of noise generated in the OBC into the system power source may be included in the OBC. The OBC may include the PFC which configured to convert an input AC power source into a DC power source and improve a power factor.

As opposed to a general PFC having a fixed output voltage, input/output voltage control of the PFC 120 may be performed by adjusting a duty ratio of a switching module of the PFC 120 and the magnitude of an output voltage of the PFC 120 applied to the DC-DC converter 130 may be adjusted according to the present invention.

In accordance with the present invention, an output voltage of the OBC may be used to adjust a frequency of the converter and an input/output voltage of the PFC. The OBC may include the DC-DC converter 130 configured to adjust an output voltage to perform charging according to a voltage required in the high-voltage battery. The DC-DC converter 130 may use an output voltage of the PFC 120 as an input voltage. The DC-DC converter 130 may be configured to adjust an output voltage of the OBC by performing frequency adjustment through configuration of a switching unit that performs a high-frequency switching on/off operation.

Generally, since the magnitude of a voltage applied from the PFC 120 is fixed, the DC-DC converter 130 is configured to perform frequency control through the high-voltage switching on/off operation, thereby adjusting the output voltage of the OBC. However, for high input/output voltage gain of the DC/DC converter 130, the magnitude of magnetizing inductance of a transformer mounted within the DC-DC converter 130 has been designed to be substantially reduced in size. When the magnitude of magnetizing inductance is designed accordingly, magnetizing current increases, and thus magnetizing circulating current of the transformer increases. Therefore, turn-off loss of a switch that performs the high-frequency switching on/off operation of the DC-DC converter 130 increases, thereby resulting in low efficiency.

As opposed to the general case, the present invention proposes an OBC for overcoming the above-described limitations by increasing the magnitude of the magnetizing inductance of the DC-DC converter 130 and simultaneously reducing the magnitude of the DC-DC converter 130 through modification of the configuration of the switch included in the DC-DC converter 130.

Figure 2:
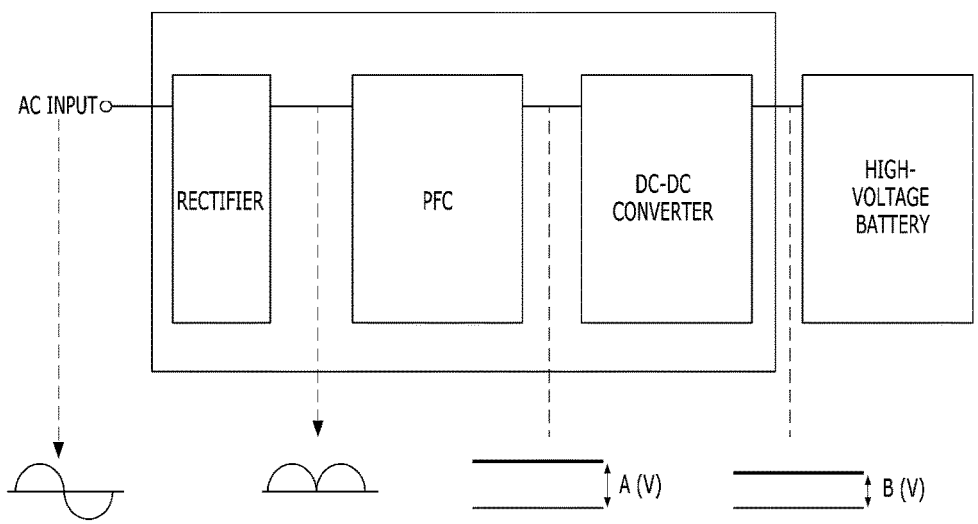
FIG. 2 is a diagram illustrating operation of each unit of an OBC when an AC power source is input according to an exemplary embodiment of the present invention.

FIG. 2 is a diagram illustrating operation of each unit included in an OBC when an AC power source is input according to an exemplary embodiment of the present invention. Referring to FIG. 2, when an AC power source is applied as an input power source, a voltage of the applied AC power source may charge a high-voltage battery 240 after AC-DC converting, DC-AC converting, increase conversion, and decrease conversion. A rectifier 210 may be configured to cause current for the input AC power source to flow in one direction. The rectifier 210 may include a diode. According to an exemplary embodiment, the rectifier 210 may be mounted within a PFC 220.

According to an exemplary embodiment, an EMI filter may be disposed between the AC input power source and the rectifier 210. The PFC 220 is a power factor corrector and may be configured to reduce power loss generated in a process of converting AC power into DC power. According to an exemplary embodiment of the present invention, the PFC 220 may be configured to equalize the magnitude of an input voltage.

A DC-DC converter 230 may be configured to increase or decrease a voltage and receive an output voltage rectified into a DC voltage by the PFC 220 as an input voltage. The DC-DC converter 230 may include a transformer and may be configured to convert the DC voltage input from the PFC 220 into an AC voltage which is increased or decreased by the transformer. The converted AC voltage may be again converted into an increased or decreased DC voltage using a rectification diode.

According to an exemplary embodiment of the present invention, the DC-DC converter 230 may be configured to convert a voltage of A[V] into a voltage of B[V]. The voltage of B[V] may be a voltage having magnitude required in a high-voltage battery. The DC-DC converter 230 may be configured to perform switching frequency control to increase or decrease the voltage applied from the PFC 220. Switching frequency control of the DC-DC converter 230 may be used to adjust ripple current of an output terminal of the DC-DC converter 230.

Since a high-voltage battery 240 may be charged with the DC voltage applied thereto, ripple current flowing into the output terminal of the DC-DC converter 230 supplying the voltage to the high-voltage battery 240 may be adjusted. The high-voltage battery 240 may provide a driving power to an eco-friendly vehicle. Further, an OBC is specifically a charger installed within the eco-friendly vehicle. The OBC may be configured to convert electric energy supplied by a commercial AC power system into a DC voltage to perform charging control according to a characteristic of the voltage battery 240.

A PHEV may include two batteries, i.e., a high-voltage battery (main battery) configured to provide a power source to an electric motor to drive vehicle wheels and a sub battery (low-voltage battery) configured to supply power to general electric devices. More specifically, an EV requires an operating power source for activating electric devices and a driving power source for driving a motor that moves the EV. The operating power source and the driving power source are supplied from a battery. Generally, to provide the driving power source, a high-voltage battery (or main battery) having relatively high energy density and high output density may be used. However, since the electric devices of the EV operate at a few volts, the electric devices may be configured to receive a power source from an additional battery (or sub-battery) that supplies a power source suitable for the electric devices. According to an exemplary embodiment of the present invention, the OBC may be configured to selectively charge the high-voltage battery 240 and the low-voltage battery.

Figure 3:
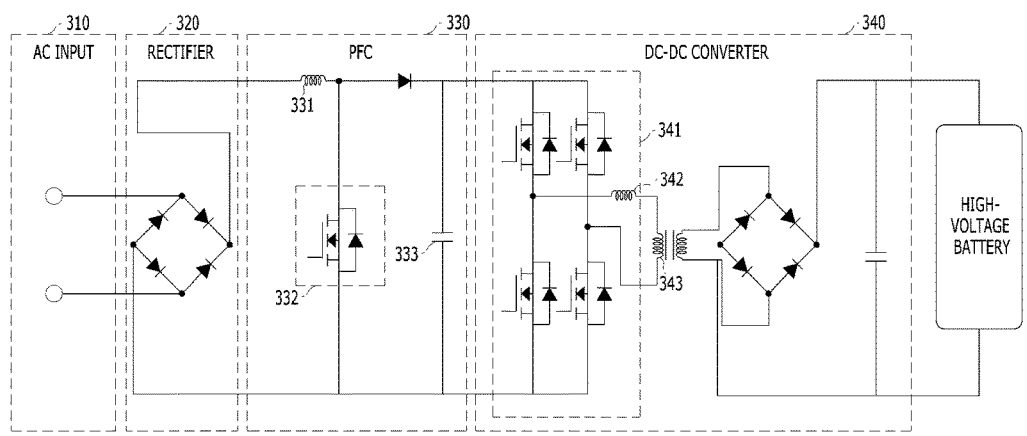
FIG. 3 is a diagram illustrating the structures of a PFC and a DC/DC converter of an OBC according to an exemplary embodiment of the present invention.

FIG. 3 is a diagram illustrating the structures of a PFC and a DC/DC converter of an OBC according to an exemplary embodiment of the present invention. Constituent elements illustrated in FIG. 3 are not always necessary and the charging control system may be implemented with more elements or fewer elements. Referring to FIG. 3, an OBC may be configured to charge a high-voltage battery with a voltage which is applied by an AC input power source 310 and passes through a rectifier 320, a PFC 330, and a DC-DC converter 340.

As an exemplary embodiment, the rectifier 320 may include a bridge circuit in which four diodes are connected as a diode bridge or a bridge rectifier. The PFC 330 is a power factor corrector and may be configured to reduce power loss generated in a process of changing an AC power source into a DC power source. The PFC 330 may be configured to increase power transmission efficiency by cancelling a phase difference between a voltage and a current of the AC power source using an impedance matching circuit. The PFC 330 may include a switching module 332 configured to equalize a power source through pulse width modulation (PWM) control.

Hereinafter, constituent elements of the PFC 330 according to an exemplary embodiment of the present invention will be described in detail. The PFC 330 may include the impedance matching circuit including an inductor L1 and a capacitor C1. The impedance circuit may be configured to equalize impedance of both sides from the viewpoint of a connection point to most efficiently transmit energy at a position at which electric circuits of different characteristics are connected.

Additionally, the impedance matching circuit may include an inductor (L1) 331 and a capacitor (C1) 333 and may be configured to perform impedance matching to efficiently transmit energy rectified by the rectifier 320 to the high-voltage battery. When impedance matching is not achieved, a reflection wave occurs and maximum energy is unable to be transmitted to the high-voltage battery. The switching module 332 may be configured to transmit energy stored in the inductor (L1) 331 to the capacitor (C1) 333 for performing the charging function.

According to an exemplary embodiment of the present invention, the switching module 332 may include a field effect transistor (FET). Generally, the FET may be configured to amplify a voltage. When a voltage is supplied to a gate of the FET, currents flows from a drain of the FET to a source of the FET or from the source to the drain. Current varies based on the magnitude of the voltage supplied to the gate and, using this property, the FET may be used to perform a switching function according to an exemplary embodiment of the present invention. The PFC 330 may be configured to increase or decrease a voltage supplied by the rectifier 320 through duty ratio control for PWM of the FET.

However, generally, the switching module 332 of the PFC 330 does not perform duty ratio control of PWM, thereby failing to adjust the magnitude of a voltage input to the rectifier 320. In the present invention, when a voltage supplied by an input power source does not reach a preset voltage, the switching module 332 increases a duty ratio, thereby increasing an output voltage of the PFC 330.

Furthermore, the PFC 330 may include a diode. The diode is a semiconductor element that causes current to flow in one direction and prevents the flow in a reverse direction and performs a rectification operation to convert an AC power source into a DC power source. The charging module 333 may be configured to store energy received from the rectifier 320 and transmit the stored energy to the DC-DC converter 340. In an exemplary embodiment of the present invention, the capacitor (C1) 333 may be configured to store the power, but is not necessarily limited to the capacitor. However, the present invention is not limited thereto and the charging module 333 may include an element capable of performing an energy storage function.

The DC-DC converter 340 may be configured to increase or decrease a voltage and receive, as an input voltage, an output voltage rectified to a DC voltage by the PFC 330. The DC-DC converter 340 may include a transformer and may be configured to convert the DC voltage supplied by the PFC 330 into an increased or decreased AC voltage through the transformer. The converted AC voltage may be converted again into an increased or decreased DC voltage using a rectification diode.

Hereinafter, the constituent elements of the DC-DC converter 340 according to an exemplary embodiment of the present invention will be described in detail. The DC-DC converter 340 may include a full bridge 341 configured to transmit the output voltage of the PFC 330 to the transformer. A voltage transmitted through a high-frequency switching on/off operation of the full bridge 341 may be rectified through the transformer and the rectified voltage may be stored in a capacitor as electric energy. The full bridge 341 may include four switches (e.g., FETs) to alternately switch a DC voltage. In particular, upper switches and lower switches may face a middle point.

Meanwhile, the OBC should satisfy charging capacitance (e.g., about 3.3 [KW]) of a high-voltage battery and an input voltage range (e.g., about 70[V] to 285[V]) and an output voltage range (e.g., about 240[V] to 413[V]) of a wide range, for application to standard on charging. Due to the input voltage range and output voltage range of a wide range, the DC-DC converter 340 needs to be designed to have high input/output voltage gain.

The input/output voltage gain of the DC-DC converter 340 may be a ratio of an input voltage to an output voltage of the DC-DC converter 340 using an output voltage of the PFC 120 as the input voltage of the DC-DC converter 340. The input/output voltage gain of the DC-DC converter 340 may be affected by the relationship between a leakage inductor (Lr) 342 and a magnetizing inductor (Lm) 343, which will be described in detail with reference to FIG. 4.

The DC-DC converter 340 may be configured to supply a voltage alternately transmitted by the PFC 330 through the full bridge 341 to the transformer and store electric energy in an output terminal thereof through the transformer and a rectifier. As an exemplary embodiment, the output terminal of the DC-DC converter 340 may include a capacitor. The high-voltage battery may be charged using a voltage stored in the output terminal of the DC-DC converter 340.

Figure 4:
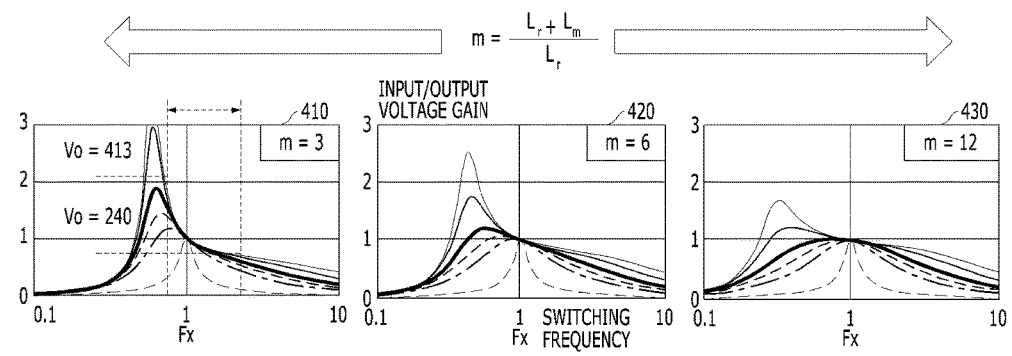
FIG. 4 is a diagram illustrating turn-off loss of a converter switch according to the ratio of a magnetizing inductance and a leakage inductance of a converter of an OBC according to an exemplary embodiment of the present invention.

FIG. 4 is a diagram illustrating turn-off loss of a converter switch according to the ratio of a magnetizing inductance and a leakage inductance of a converter of an OBC according to an exemplary embodiment of the present invention. Referring to FIG. 4, a value of m for the ratio of the leakage inductor (Lr) 342 and the magnetizing inductor (Lm) 343 is defined as in Equation 1 below.

$$m = \frac{L_r + L_m}{L_r} \qquad \text{Equation 1}$$

When the value of m is small (e.g., m=3), relatively flexible control may be performed due to high input/output voltage gain, a narrow frequency range, and a wide input/output voltage gain range. When the value of m is large (e.g., m=12), since the magnitude of the magnetizing inductor is greater, inductance increases, magnetizing circulating current decreases, and turn-off loss of a switching decreases, thereby achieving high efficiency of the DC-DC converter.

Generally, when the input voltage of the DC-DC converter is uniform, magnetizing inductance of a transformer mounted within a DC-DC converter should be designed to be of a reduced size to acquire high input/output voltage gain. When magnetizing inductance is designed accordingly, magnetizing current increases, magnetizing circulating current of the transformer increases, and turn-off loss of the switch increases, thereby deteriorating efficiency of the DC-DC converter.

To solve the above problem, magnetizing inductance is designed to be larger in size according to the present invention. In addition, the DC-DC converter may include a half bridge and a charging terminal of a PFC may include upper and lower capacitors and thus, voltage adjustment of the PFC may be performed.

Figure 5:
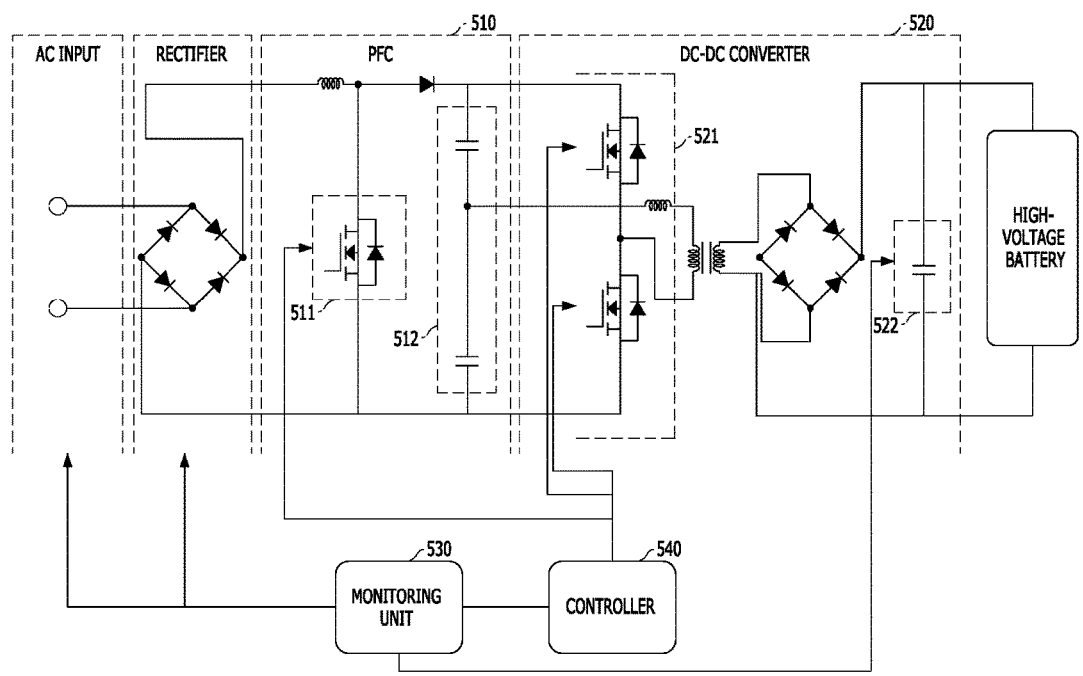
FIG. 5 is a diagram illustrating configuration of an OBC for voltage control of a switching module of a PFC and frequency control of a converter according to an exemplary embodiment of the present invention.

FIG. 5 is a diagram illustrating configuration of an OBC for voltage control of a switching module of a PFC and frequency control of a converter according to an exemplary embodiment of the present invention. Referring to FIG. 5, the OBC may be configured to perform voltage control for adjusting the magnitude of an output voltage of a PFC 510 (e.g., an input voltage of a DC-DC converter 520) by adjusting a duty ratio of a switching module of the PFC 510 and perform frequency control of a half bridge 521 for operating the DC-DC converter 520 by monitoring ripple current of an output terminal of the DC-DC converter 520.

A charging module 512 of the PFC 510 may include an upper capacitor (e.g., a first capacitor) and a lower capacitor (e.g., a second capacitor). A voltage applied to the upper capacitor may be transmitted to a transformer when an upper switch (e.g., a first switch) of the half bridge 521 of the DC-DC converter 520 is activated and a voltage applied to the lower capacitor may be transmitted to the transformer when a lower switch (e.g., a second switch) of the half bridge 521 is activated. The upper and lower switches may be configured to alternately transmit a DC voltage to the transformer by a controller 540. For example, when a voltage of an output terminal of the PFC 510 is about 700[V], a voltage of about 350[V] may be applied to each of the upper and lower capacitors and the voltage of about 350[V] may be alternately applied to the transformer due to alternating activation of the upper and lower switches of the DC-DC converter 520.

Meanwhile, a switching module 511 of the PFC 510 may be configured to adjust a duty ratio to increase or decrease the magnitude of a voltage applied to the PFC 510. For example, when a low voltage is applied to the PFC 510, the controller 540 may be configured to increase the voltage by increasing the duty ratio of the switching module 511. The DC-DC converter 520 may include the half bridge 521, the transformer, a rectifier, and an output terminal 522.

In the present invention, input/output voltage gain of the DC-DC converter 520 may have a fixed value and frequency control for adjusting ripple current of the output terminal 522 may be performed. Frequency control for adjusting ripple current may be changed within a predetermined range based on a preset operating frequency. A monitoring unit 530 may be configured to monitor an AC input voltage or an output voltage of a rectifier to calculate the magnitude of an input voltage of the PFC 510. The monitoring unit 530 may also be configured to monitor a voltage of the output terminal 522 of the DC-DC converter 520.

The monitoring unit 530 may be configured to transmit a monitoring result of the AC input voltage or the output voltage of the rectifier to the controller 540. The controller 540 may be configured to compare the magnitude of the AC input voltage or the output voltage of the rectifier (e.g., input voltage of the PFC 510) transmitted by the monitoring unit 530 with a preset reference voltage and adjust the duty ratio of the switching module 511 to increase or decrease the input voltage of the PFC 510.

For example, when the input voltage of the PFC 510 is less than the reference voltage, the controller 540 may be configured to increase the input voltage of the PFC 510 by increasing the duty ratio of the switching module 511. In addition, the controller 540 may be configured to receive ripple current of the output terminal 522 of the DC-DC converter 520 from the monitoring unit 530 and adjust switching frequency of the half bridge 521 to cancel ripple current.

Figure 6:
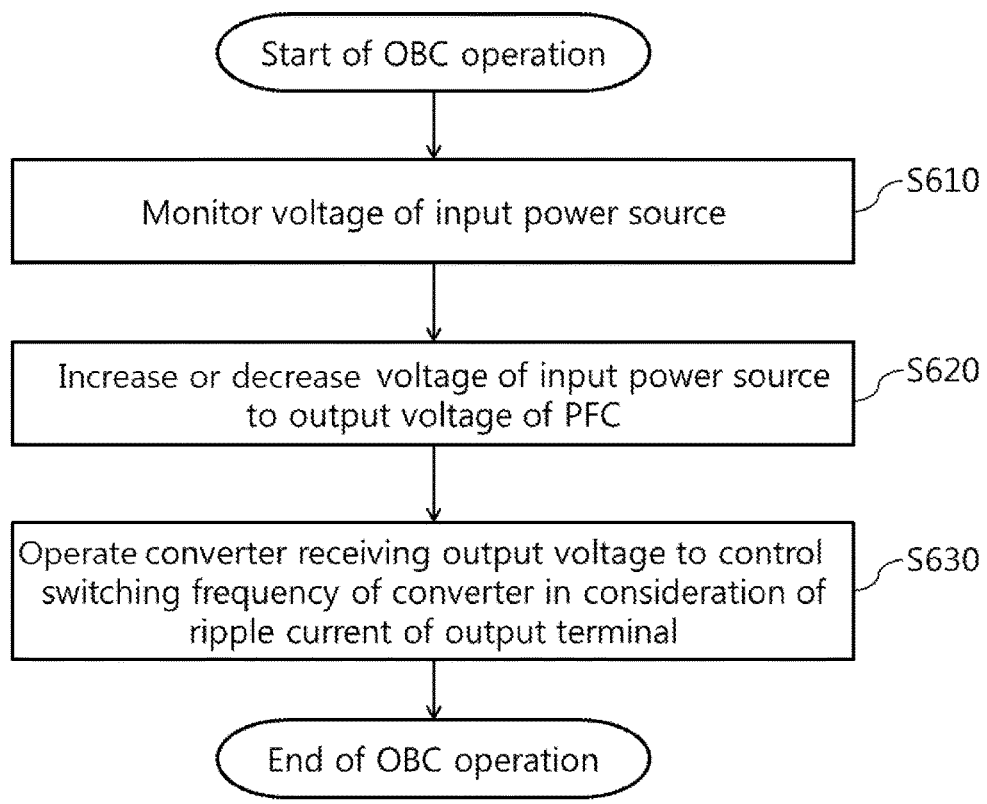
FIG. 6 is a flowchart illustrating an OBC control method according to an exemplary embodiment of the present invention.

FIG. 6 is a flowchart illustrating an OBC control method according to an exemplary embodiment of the present invention. Referring to FIG. 6, an OBC may be configured to monitor a voltage of an input power source (S610). The input voltage of a PFC may be monitored to thus transmit the input voltage of the PFC to a DC-DC converter after increasing or decreasing the input voltage.

The monitoring unit may further be configured to monitor the voltage of the input power source to calculate the magnitude of the input voltage of the PFC. In addition, the monitoring unit may be configured to monitor an output voltage of a rectifier and the voltage of the input power source. The OBC may be configured to increase or decrease the voltage of the input power source to a preset output voltage of the PFC (S620).

A switching module of the PFC may be configured to increase or decrease the voltage of the input power source to the output voltage of the PFC by adjusting a duty ratio. The output voltage of the PFC may be stored in a charging module of the PFC. The charging module of the PFC may include an upper capacitor (e.g., a first capacitor) and a lower capacitor (e.g., a second capacitor). The upper and lower capacitors may be configured to alternately apply a voltage to a DC-DC converter based on switching frequency of a half bridge of the DC-DC converter.

The OBC may be configured to operate the converter receiving the output voltage to adjust switching frequency of the converter in consideration of ripple current of an output terminal (S630). The OBC may be configured to adjust switching frequency of a half bridge to adjust ripple current by monitoring ripple current of the output terminal of the DC-DC converter. The DC-DC converter may have fixed input/output voltage gain. Therefore, ripple current may be adjusted by adjusting the switching frequency within a predetermined range based on a reference frequency.

The OBC control method and apparatus according to the present invention have the following effects.

Firstly, the number of switches included in an OBC may be reduced relative to that included in a conventional OBC. Therefore, volume occupied by the OBC in a vehicle and material costs may be reduced.

Secondly, the magnitude of a magnetizing inductance of a transformer in a converter may be designed to be increased through voltage control of a PFC and thus turn-off loss of a switch in the converter may be reduced, thereby improving efficiency.

Thirdly, turn-off loss may be reduced and overall energy efficiency may be increased to thus improve fuel efficiency directly related to charging efficiency of the OBC.

It will be appreciated by persons skilled in the art that that the effects that may be achieved through the present invention are not limited to what has been particularly described hereinabove and other advantages of the present invention will be more clearly understood from the above detailed description.

The method according to the above-described exemplary embodiment may be implemented as a computer-executable program that can be recorded in a non-transitory computer-readable medium. Examples of the non-transitory computer-readable medium include a Read Only Memory (ROM), a Random Access Memory (RAM), a Compact Disc (CD)-ROM, a magnetic tape, a floppy disk, an optical data storage, and a carrier wave (e.g., data transmission over the Internet). Functional programs, code, and code segments needed to realize the above-described method can be easily derived by programmers skilled in the art.

Those skilled in the art will appreciate that the present invention may be embodied in other specific forms than those set forth herein without departing from the spirit and essential characteristics of the present invention.

The above detailed description is therefore to be construed in all aspects as illustrative and not restrictive. The scope of the invention should be determined by reasonable interpretation of the appended claims and all changes coming within the equivalency range of the invention are within the scope of the invention.

What is claimed is:

1. A method of controlling an on-board charger (OBC), the method comprising:

monitoring, by a controller, a voltage of an input power source;

increasing or decreasing, by the controller, the voltage of the input power source to a preset output voltage of a power factor corrector (PFC); and operating, by the controller, a converter receiving the preset output voltage to adjust a switching frequency of the converter based on a ripple current of an output terminal of the converter, wherein the converter includes a first switch configured to switch an output of a first voltage of a first capacitor mounted within the PFC and a second switch configured to switch an ouput of a second voltage of a second capacitor mounted within the PFC.

2. The method according to claim 1, wherein the converter has a voltage gain of a fixed value and the voltage gain is a ratio of an output voltage to an input voltage of the converter.

3. The method according to claim 1, wherein the increasing or the decreasing includes adjusting a duty ratio of a switching module included in the PFC.

4. The method according to claim 3, wherein the PFC includes a charging module in which energy transmitted through controlling the duty ratio of the switching module is stored.

5. The method according to claim 4, wherein the first capacitor and the second capacitor of the charging module mounted within the PFC are connected in series.

6. The method according to claim 3, wherein the adjusting a duty ratio includes performing an adjustment using a field effect transistor (FET) and a diode.

7. The method according to claim 1, wherein the operation of the converter to adjust the switching frequency further includes adjusting the switching frequency by alternating switching operations of the first switch and the second switch.

8. The method according to claim 1, wherein the operation of the converter to adjust the switching frequency includes adjusting the switching frequency based on the ripple current based on a fixed frequency within a threshold range.

9. The method according to claim 1, wherein the first switch and the second switch are connected in series.

10. A non-transitory computer readable medium containing program instructions executed by a controller for operating an on-board charger (OBC), the computer readable medium comprising:

program instructions that monitor a voltage of an input power source;

program instructions that increase or decrease the voltage of the input power source to a preset output voltage of a power factor corrector (PFC); and program instructions that operate a converter receiving the preset output voltage to adjust a switching frequency of the converter based on a ripple current of an output terminal of the converter, wherein the converter includes a first switch configured to switch an output of a first voltage of a first capacitor of the PFC and a second switch configured to receive switch an output of a second capacitor of the PFC.

11. An on-board charger (OBC), comprising:

a monitoring unit configured to monitor a voltage of an input power source and a ripple current of an output terminal;

a power factor corrector (PFC) configured to increase or decrease the voltage of the input power source to a preset output voltage;

a converter including a first switch configured to perform a control to switch an output of a first voltage of a first capacitor mounted within the PFC and a second switch configured to perform a control to switch an output of a second voltage of a second capacitor mounted within the PFC; and a controller configured to operate the PFC and execute switching operations of the first switch and the second switch of the converter.

12. The OBC according to claim 11, wherein the converter is configured to receive the preset output voltage of the PFC and vary switching frequencies of the first switch and the second switch based on the ripple current of the output terminal.

13. The OBC according to claim 12, wherein the controller is configured to adjust the switching frequencies by alternating switching operations of the first switch and the second switch.

14. The OBC according to claim 12, wherein the controller is configured to adjust the switching frequencies based on the ripple current based on a fixed frequency within a threshold range.

15. The OBC according to claim 11, wherein the converter has a voltage gain of a fixed value and the voltage gain is a ratio of an output voltage to an input voltage of the converter.

16. The OBC according to claim 11, wherein the controller is configured to adjust a duty ratio of a switching module mounted within the PFC.

17. The OBC according to claim 16, wherein the PFC includes a charging module in which energy transmitted through controlling the duty ratio of the switching module is stored.

18. The OBC according to claim 17, wherein the first capacitor and the second capacitor included in the charging module mounted within the PFC are connected in series.

19. The OBC according to claim 16, wherein the controller is configured to adjust the duty ratio using a field effect transistor (FET) and a diode.

20. The OBC according to claim 11, wherein the first switch and the second switch are connected in series.

* * * * *